United States Patent [19]

Kuwahara et al.

[11] Patent Number: 5,442,559
[45] Date of Patent: Aug. 15, 1995

[54] NAVIGATION APPARATUS

[75] Inventors: Shingo Kuwahara; Satoshi Odagawa, both of Kawagoe, Japan

[73] Assignee: Pioneer Electronic Corporation, Tokyo, Japan

[21] Appl. No.: 132,826

[22] Filed: Oct. 7, 1993

[30] Foreign Application Priority Data

Oct. 14, 1992 [JP] Japan .................................. 4-275853

[51] Int. Cl.$^6$ ............................................ G06F 165/00
[52] U.S. Cl. .................... 364/449; 364/443; 340/990; 340/995
[58] Field of Search ...................... 364/443, 444, 449; 73/178 R; 340/988, 990, 995

[56] References Cited

U.S. PATENT DOCUMENTS

| | | | |
|---|---|---|---|
| 4,763,270 | 8/1988 | Itoh et al. | 340/995 |
| 4,782,447 | 11/1988 | Ueno et al. | 364/449 |
| 4,926,336 | 5/1990 | Yamada | 364/444 |
| 4,937,752 | 6/1990 | Nanba et al. | 364/449 |
| 4,937,753 | 6/1990 | Yamada | 364/449 |
| 4,943,925 | 7/1990 | Moroto et al. | 340/995 |
| 5,067,082 | 11/1991 | Nimura et al. | 364/444 |

*Primary Examiner*—Gary Chin
*Attorney, Agent, or Firm*—Young & Thompson

[57] ABSTRACT

A navigation apparatus is provided with: a measurement unit for measuring a self-position and outputting self-position data; a memory unit for storing map data which includes crossing data and road data; a map-matching unit, for map-matching the self-position data with respect to the road data; and a displaying unit for displaying the map-matched self-position data and the road data on the map data. The map-matching unit is provided with a first crossing searching unit for searching crossing data corresponding to a first crossing connected to a road, to which the self-position data is presently map-matched, and located within a first predetermined distance from the self-position. The first crossing searching unit outputs first candidacy crossing data. The map-matching unit is also provided with a second crossing searching unit for searching crossing data corresponding to a second crossing located within a second predetermined distance from the first crossing. The second crossing searching unit outputs second candidacy crossing data. The map-matching unit is further provided with a map-matching control unit for map-matching the self-position data with respect to the road data corresponding to roads connected to the first and second crossings indicated by the first and second candidacy crossing data.

6 Claims, 5 Drawing Sheets

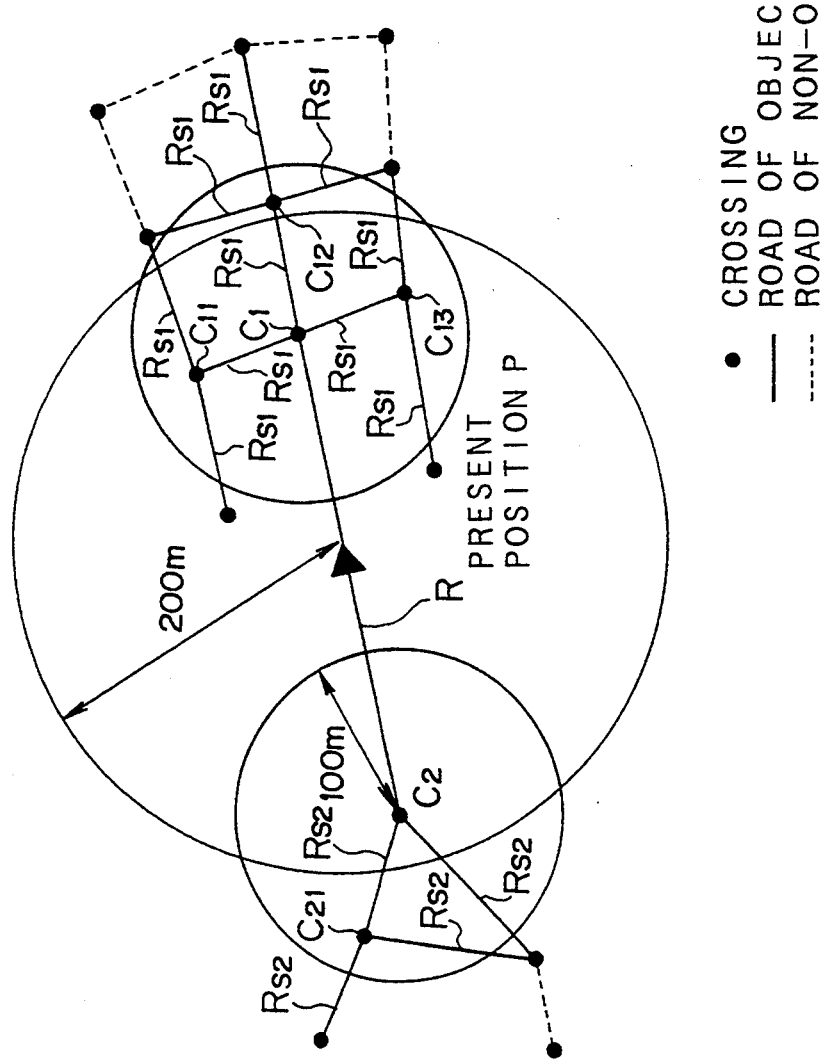

NAVIGATION APPARATUS

BACKGROUND OF THE INVENTION

1. Field of the Invention

The present invention is related with a navigation apparatus, and more particularly, it is related with a display apparatus of an on-vehicle navigation apparatus.

2. Description of the Related Art

There is a navigation apparatus of so-called self-sustaining type, as a measurement apparatus for various movable bodies, such as a car, an airplane, and a vessel. This self-sustaining type navigation apparatus, is constituted to obtain the present position by obtaining a two dimensional displacement (the amount of the vector) of a movable body, from azimuth data from an azimuth sensor, and speed data from a speed sensor, and by integrating the two dimensional displacement to a standard point. For example, in the case of a car, the navigation apparatus obtains the present position (data), by integrating the integrated travel distance and the integrated azimuth obtained from a travel distance sensor and an azimuth sensor respectively, to the standard point.

More concretely, for example, the navigation apparatus obtains the integrated travel distance by making the number of rotations of a drive shaft correspond to the number of pulses, which are generated by the number-of-rotations sensor attached to the drive shaft, and then by multiplying a distance correction coefficient with the distance computed from the total number of pulses generated from the time at the standard position to the time at the present position. On the other hand, the navigation apparatus obtains the integrated azimuth by integrating the azimuth obtained by the earth magnetism sensor.

There is a GPS (Global Positioning System) navigation apparatus developed as a measurement apparatus using an artificial satellite. This GPS navigation apparatus is constituted to receive electric waves from, generally, three or more GPS satellites, and obtain the pseudo-distance data including a time offset of the receiver between each GPS satellite and the receiving point (self-position), the position data of each GPS satellite, and the present position (data) of the receiving point.

As an actual example of such a measurement apparatus applied to a navigation apparatus, there is a simple apparatus, which numerically indicates the latitude and longitude of the present position, and there is also an advanced apparatus, which displays various data, such as a self-position, a distance to the destination, a velocity etc., on a map picture plane displayed on the picture plane of a CRT (Cathode Ray Tube).

This type of navigation apparatus, which displays various data on the CRT picture plane, is constituted to read out map data including the obtained present position, from a memory media, such as a CD-ROM, to perform map-matching by use of the read out map data and the obtained present position data, to generate picture-plane data, and to display the present self-position, the direction of advance, etc. on the map, which is displayed on the picture plane of the CRT. By this displayed image, a user can grasp the present self-position in association with the map.

Here, the map-matching is explained.

Digitized map data includes information of the azimuth and distance as the inclination and length of a line. The technique of estimating the exact present position by use of this information of azimuth and distance, is called map-matching. Even when the detected azimuth shifts slightly, for example, due to the error of the sensor, if the possibility that the present position is on the road on which the car has been travelling until now is judged to be high, the display without sense of incongruity can be accomplished by correcting the present position onto the road, by virtue of this map-matching technique.

When performing the map-matching in the above mentioned conventional navigation system, all of the roads within the predetermined range, which has a center at the present position, become the object of map-matching.

Therefore, such a road also becomes the object of map-matching, which has little relationship with the road on which the car is presently travelling. For example, such a road, into which the car cannot go no matter how it travels from the present position within the range, or such a road, having a turning point from the road, on which the car is presently travelling, only at a position distant from the present position, becomes the object of map-matching.

For this reason, there are problems that the process time becomes long and the processing speed is lowered to increase the burden on the calculating apparatus, and that the accuracy of map-matching is decreased.

SUMMARY OF THE INVENTION

It is therefore an object of the present invention to provide a navigation apparatus, which can reduce the process time of map-matching, decrease the burden on the calculating apparatus, and improve the accuracy of map-matching.

According to the present invention, the above mentioned object can be achieved by a navigation apparatus, provided with: a measurement unit for measuring a self-position and outputting self-position data; a memory unit for storing map data which includes crossing data indicating crossings and road data indicating roads each connecting two crossings; a map-matching unit, coupled to the measurement unit and the memory unit, for map-matching the self-position data with respect to the road data; and a displaying unit for displaying the map-matched self-position data and the road data on the map data. The map-matching unit is provided with a first crossing searching unit for searching crossing data corresponding to a first crossing connected to a road, to which the self-position data is presently map-matched, and located within a first predetermined distance from the self-position. The first crossing searching unit outputs first candidacy crossing data indicating the searched first crossing. The map-matching unit is also provided with a second crossing searching unit for searching crossing data corresponding to a second crossing located within a second predetermined distance from the first crossing indicated by the first candidacy crossing data. The second crossing searching unit outputs second candidacy crossing data indicating the searched second crossing. The map-matching unit is further provided with a map-matching control unit for map-matching the self-position data with respect to the road data corresponding to roads connected to the first and second crossings indicated by the first and second candidacy crossing data.

According to the present invention, the first crossing searching unit searches crossing data corresponding to the crossing, which is connected to the road corresponding to the presently matched road data and which is within a first predetermined distance. Then, the first crossing searching unit outputs thus searched crossing data as first candidacy crossing data. The second crossing searching unit searches crossing data corresponding to the crossing, which is located within a second predetermined distance from the crossing corresponding to the first candidacy crossing data. Then, the second crossing searching unit outputs thus searched crossing data as second candidacy crossing data.

As a result, the map-matching control unit performs the map-matching with respect to only the road data, as the object of map-matching, which correspond to the roads connected to the crossings corresponding to the first candidacy crossing data and the second candidacy crossing data.

Therefore, since the object of map-matching can be restricted to a certain extent, the map-matching accuracy can be increased, and the operation time required for map-matching can be shortened, so that the burden on the map-matching unit as an calculating apparatus can be reduced.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram for explaining an operation of the embodiment.

DETAILED DESCRIPTION OF THE PREFERRED EMBODIMENTS

Referring to the accompanying drawings, an embodiment of the present invention will be now explained.

Figure 1:
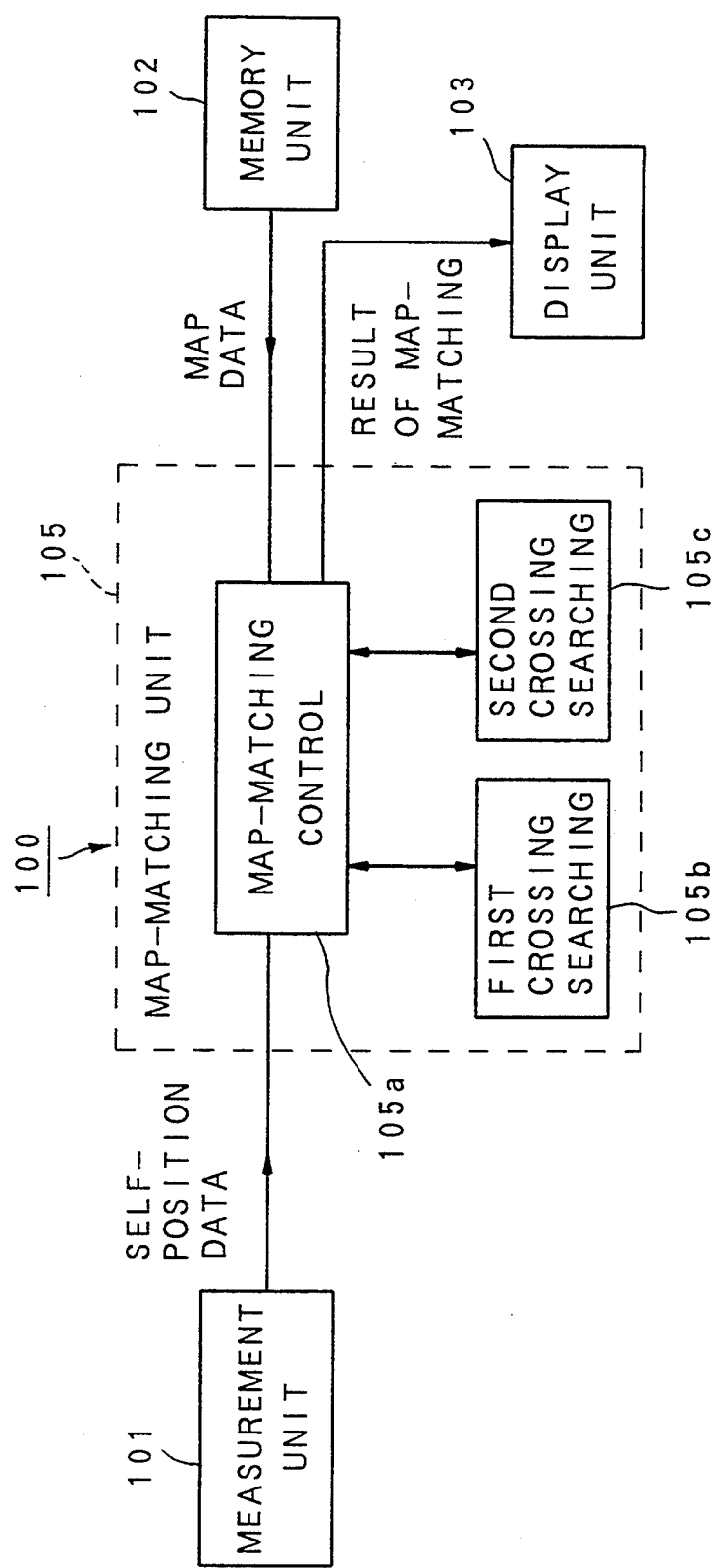
FIG. 1 is a block diagram which indicates a basic construction of the present invention.

Firstly, a basic construction of the present invention is explained with FIG. 1.

In FIG. 1, a navigation apparatus 100 is provided with: a measurement unit 101, a memory unit 102, a display unit 103, and a map-matching unit 105.

The measurement unit 101 measures a self-position and outputs self-position data to the map-matching unit 105. The memory unit 102 stores map data, which includes crossing data corresponding to crossings and road data indicating a road connecting two crossings. The map-matching unit 105 performs map-matching on the basis of the self-position data and the map data. The display unit 103 is adapted to display self-position data on a map display picture plane on the basis of the result of the map-matching.

The map-matching unit 105 is provided with a map-matching control unit 105a, a first crossing searching unit 105b, and a second crossing searching unit 105c.

The first crossing searching unit 105b searches crossing data corresponding to a crossing, which is connected to a road corresponding to the presently matched road data and is within a first predetermined distance from the present position, and for outputting first candidacy crossing data. The second crossing searching unit 105c searches crossing data corresponding to a crossing, which exists within a second predetermined distance from the crossing corresponding to the first candidacy crossing data, and outputs a second candidacy crossing data.

The map-matching control unit 105a performs map-matching with respect to only the road data corresponding to the road connected to the crossing corresponding to the first candidacy crossing data or the second candidacy crossing data, as an object of map-matching.

Figure 2:
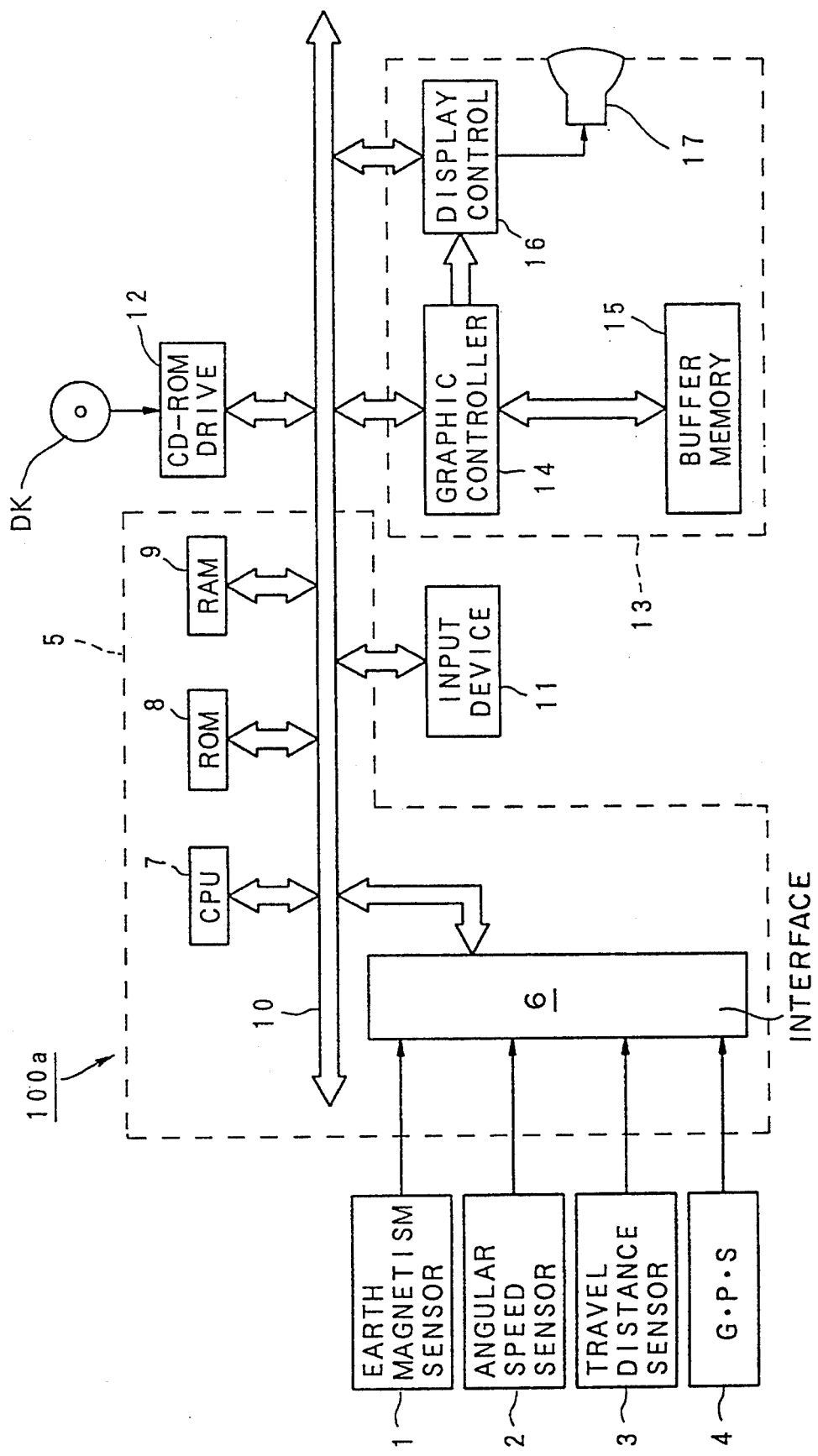
FIG. 2 is a block diagram which indicates an outline constitution of a navigation apparatus of an embodiment according to the present invention.

FIG. 2 is a block diagram indicating a construction of a preferred embodiment in case of applying the above mentioned present invention to an on-vehicle navigation apparatus.

In FIG. 2, an on-vehicle navigation apparatus 100a is provided with an earth magnetism sensor 1, an angular speed sensor 2, a travel distance sensor 3, and a GPS receiver 4, as an example of the measurement unit 101 in FIG. 1. The navigation apparatus 100a is also provided with a system controller 5 as an example of the map-matching unit 105 in FIG. 1, an input unit 11, a CD-ROM drive 12 as an example of the memory unit 102 in FIG. 1, and a display unit 13.

In FIG. 2, the earth magnetism sensor 1 outputs azimuth data as for the direction of advance of the self-vehicle. The angular speed sensor 2 detects the angular speed at the time of driving of the vehicle and outputs angular speed data. The travel distance sensor 3 outputs travel distance data by detecting and integrating the number of rotations of a drive shaft of the vehicle. The GPS receiver 4 receives electric waves from GPS satellites and outputs GPS measurement data. The system controller 5 controls the whole navigation apparatus on the basis of the azimuth data, the angular speed data, the travel distance data, and the GPS measurement data. The input device 11 is a device to input various data. The CD-ROM drive 12 reads out various data, such as map data, from a CD-ROM disk DK under the control of the system controller 5, and outputs it. The display unit 13 displays various display data under the control of the system controller 5.

The system controller 5 is provided with: an interface section 6 for performing an interface operation with the external; a CPU 7 for controlling the whole portion of the system controller 5; a ROM 8 for storing the control program which controls the system controller 5; and a RAM 9 having a non-volatility memory section not illustrated, for reliably storing various data. The system controller 5 is connected with the input device 11, the CD-ROM drive 12, and the display unit 13 through a bus line 10.

The display unit 13 is provided with: a graphic controller 14 for controlling the whole portion of the display unit 13 on the basis of control data sent from the CPU 7 through the bus line 10; a buffer memory 15 consisting of memories, such as a VRAM (Video RAM), for temporarily storing image information which can be instantly displayed; and a display control section 16 for performing display control of a display device 17, such as a liquid crystal display apparatus, a CRT etc., on the basis of picture data outputted from the graphic controller 14.

Figure 3:
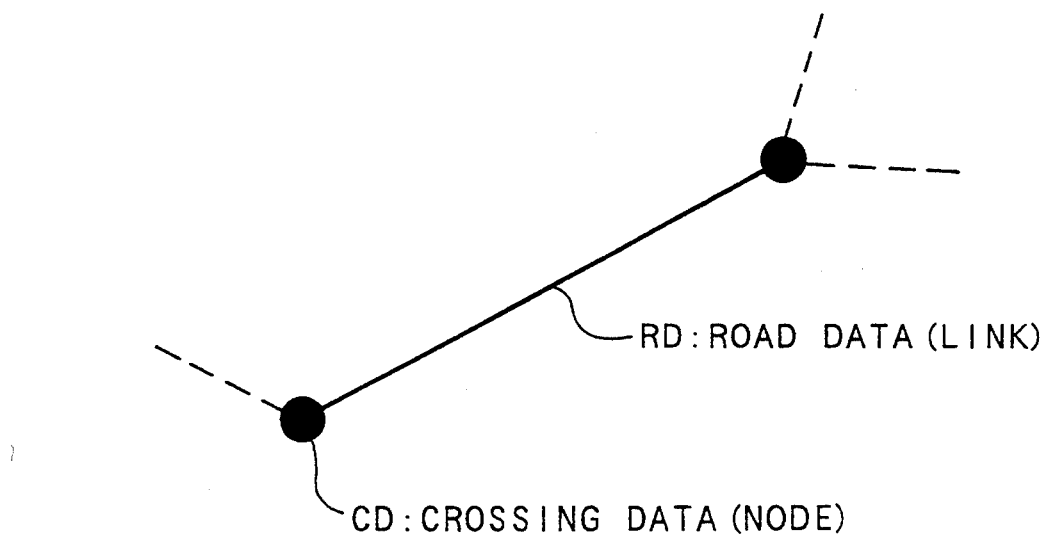
FIG. 3 is a figure for explaining the concepts of crossing data and road data in the embodiment.

Here, the concepts of the crossing data and the road data in the map data will be explained with reference to FIG. 3.

The road data RD (link data) indicates each line segment in the case of approximating an actual road by use of a line segment, and is the data corresponding to the line segment connecting two crossings, two bending points, or the crossing and the bending point of the actual road.

The crossing data CD (node data) is coordinate data which indicates the position of the crossing or the bending point of the road, and is expressed by the longitude, the latitude, etc. concretely.

The actual road is modeled by combining a line segment corresponding to one or a plurality of road data RD, with a crossing indicated by the crossing data CD, and also combining a line segment corresponding to one or a plurality of road data RD, with a bending point indicated by the crossing data CD.

Nextly, the operation of the present embodiment will be explained with reference to FIGS. 4 and 5.

Figure 4:
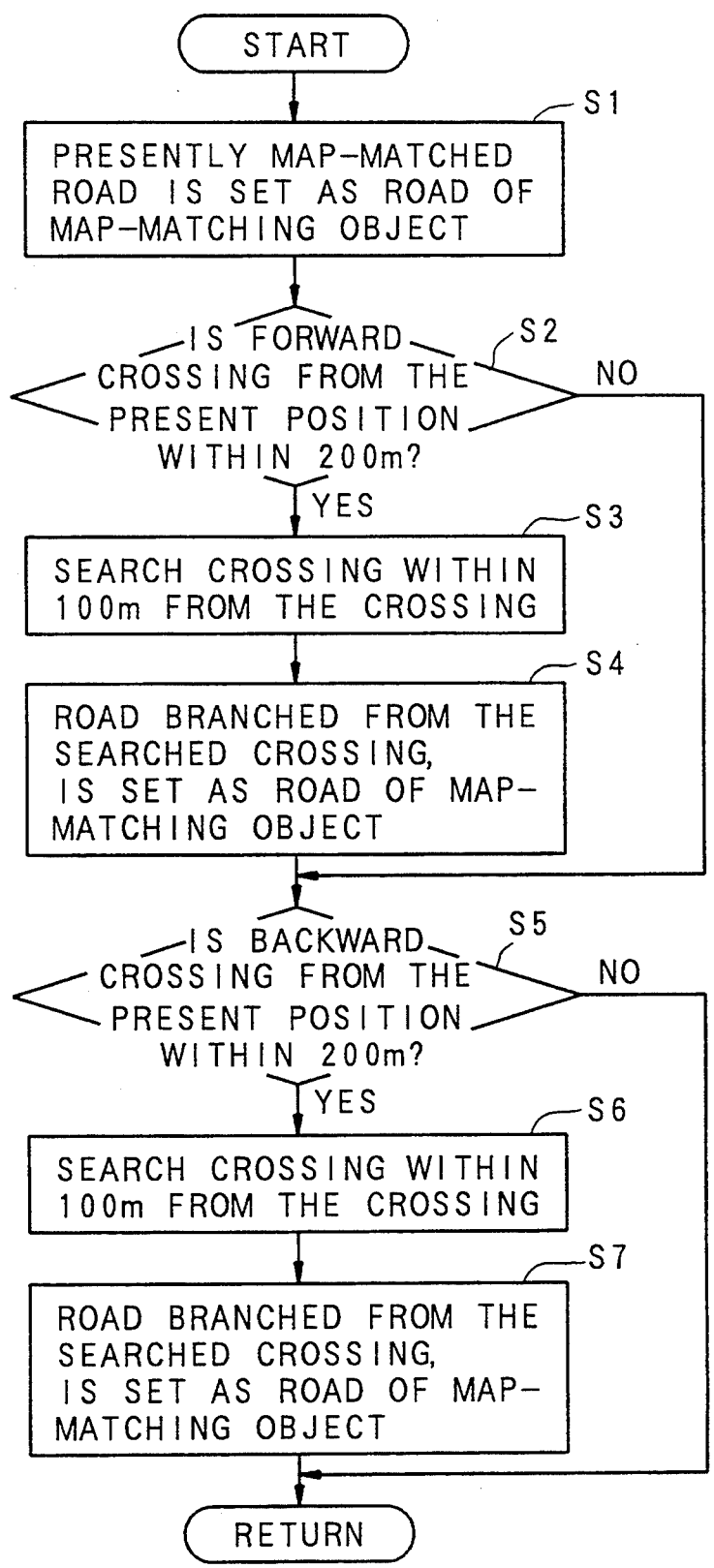
FIG. 4 is a flow chart of an operation of the embodiment.

FIG. 4 indicates the process flow chart which indicates an outline operation of the present embodiment.

Firstly, the system controller 5 sets the road R, which is considered to be in the presently map-matched condition, as the road of map-matching object (step S1).

Nextly, the system controller 5 judges whether or not the crossing (hereinbelow, it is referred as a forward crossing) $C_1$ located forward of the present position P on the road R, i.e. the road of map-matching object, is located within 200 m (a first predetermined distance) from the present position, as shown in FIG. 5, on the basis of the road data RD and the crossing data CD (step S2).

If the forward crossing $C_1$ is not located within 200 m (NO), the process is shifted to a step S5.

On the other hand, if the forward crossing $C_1$ is located within 200 m (YES), the system controller 5 searches a crossing, which is connected (linked) to the forward crossing $C_1$ by a road, and which is located within 100 m (a second predetermined distance) from the forward crossing $C_1$ (step S3).

Concretely, the crossings $C_{11}$–$C_{13}$ are searched to become the crossings connected to the forward crossing $C_1$ as shown in FIG. 5.

Nextly, the map-matching process is performed with respect to the road data of the roads as the map-matching object, which are connected to the forward crossing $C_1$, and to the crossings $C_{11}$–$C_{13}$ searched in the step S3 (step S4). Concretely, the map-matching is performed with respect to the road data corresponding to the roads $R_{S1}$ as the map-matching object.

In other words, the above mentioned map-matching is performed with respect to the roads, as the map-matching object, which are branched from the forward crossing ($C_1$) and located within 200 m from the present position, and with respect to the roads which are branched from the crossings located within 100 m from the forward crossing ($C_1$).

Nextly, the system controller 5 judges whether or not the crossing $C_2$ located backward of the present position P on the road R i.e. the road of map-matching object, is located within 200 m as shown in FIG. 5, on the basis of the road data RD and the crossing data CD (step S5).

If the crossing (hereinbelow, it is referred as a backward crossing) $C_2$ is not located within 200 m (NO), the map-matching process is once ended, and other processes are performed.

If the backward crossing $C_2$ is located within 200 m from the present position P (YES), the crossings connected (linked) by the roads from the backward crossing $C_2$ within 100 m, are searched (step S6).

Concretely, the crossing $C_{21}$ becomes the crossing connected to the backward crossing $C_2$ as shown in FIG. 5.

In other words, in the process of the above-mentioned steps S5–S6, the map-matching is performed with respect to the road, as the map-matching object, which is branched from the backward crossing ($C_2$) and located within 200 m from the present position, and to the road, which is branched from the crossing located within 100 m from the backward crossing ($C_2$).

Nextly, the map-matching is performed with respect to the road data of the roads, as the map-matching object, which are connected to the backward crossing $C_2$, and to the crossing $C_{21}$ searched in the step S6 (step S7).

Therefore, only the roads $R_{S1}, \ldots, R_{S1}, R_{S2}, \ldots, R_{S2}$, into which the car can go easily from the road R which is presently map-matched, become the roads of map-matching object, and the number of objects decreases, so that the process time can be shortened, and the matching accuracy can be improved.

As explained above, since only the roads, where the possibility of entering is high, are made to be the roads of map-matching object, the map-matching accuracy can be improved, and since the calculation process amount can be decreased, the burden on the calculation apparatus can be reduced, according to the present embodiment.

In the above explanation, although only one road is used as the map-matching object in the step S1, if there is a possibility that the present position exists on a plurality of roads, it is also possible to perform the same process with respect to the road data of a plurality of the roads of the map-matching object.

As described above in detail, since it is possible to reduce the number of the roads to be the map-matching object, the process time for map-matching can be reduced, the burden on the calculating apparatus can be reduced, and the accuracy of map-matching can be improved, according to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus comprising:
   a measurement means for measuring a self-position and outputting self-position data;
   a memory means for storing map data which includes crossing data indicating crossings and road data indicating roads each connecting two crossings;
   a map-matching means, coupled to said measurement means and said memory means, for map-matching the self-position data with respect to the road data; and
   a displaying means for displaying the map-matched self-position data and the road data on the map data,
   said map-matching means comprising:
   a first crossing searching means for searching crossing data corresponding to a first crossing connected to a road, to which the self-position data is presently map-matched, and located within a first predetermined distance from the self-position, and for outputting first candidacy crossing data indicating the searched first crossing and the associated immediate adjacent crossings;

a second crossing searching means for searching crossing data corresponding to a second crossing located within a second predetermined distance from the first crossing indicated by said first candidacy crossing data, and for outputting second candidacy crossing data indicating the searched second crossing and the associated immediate adjacent crossings; and a map-matching control means for map-matching the self-position data only with respect to the road data corresponding to roads connected to the first and second crossings and their corresponding associated adjacent crossings indicated by the first and second candidacy crossing data.

2. A navigation apparatus according to claim 1, wherein said measurement means comprises at least one of an earth magnetism sensor, an angular speed sensor, a travel distance sensor and a GPS (Global Positioning System) receiver.

3. A navigation apparatus according to claim 1, wherein said road data comprise data indicating a line segment connecting two crossings, data indicating a line segment connecting two bending points, and data indicating a line segment connecting a crossing and a bending point.

4. A navigation apparatus according to claim 1, wherein said crossing data comprise coordinate data indicating a position of a crossing and coordinate data indicating a position of a bending point, each expressed by longitude and latitude.

5. A navigation apparatus according to claim 1, wherein said second crossing searching means searches the crossing data corresponding to the second crossing, which is connected to the first crossing by a road.

6. A navigation apparatus according to claim 1, wherein said display unit comprises:

a displaying device having a picture plane for performing various displays; and a display control device for controlling the display device to display the self-position data on the map data on the picture plane.

* * * * *